3 Sheets—Sheet 1.
C. G. EVERET.
Corn-Planter.
No. 216,386. Patented June 10, 1879.
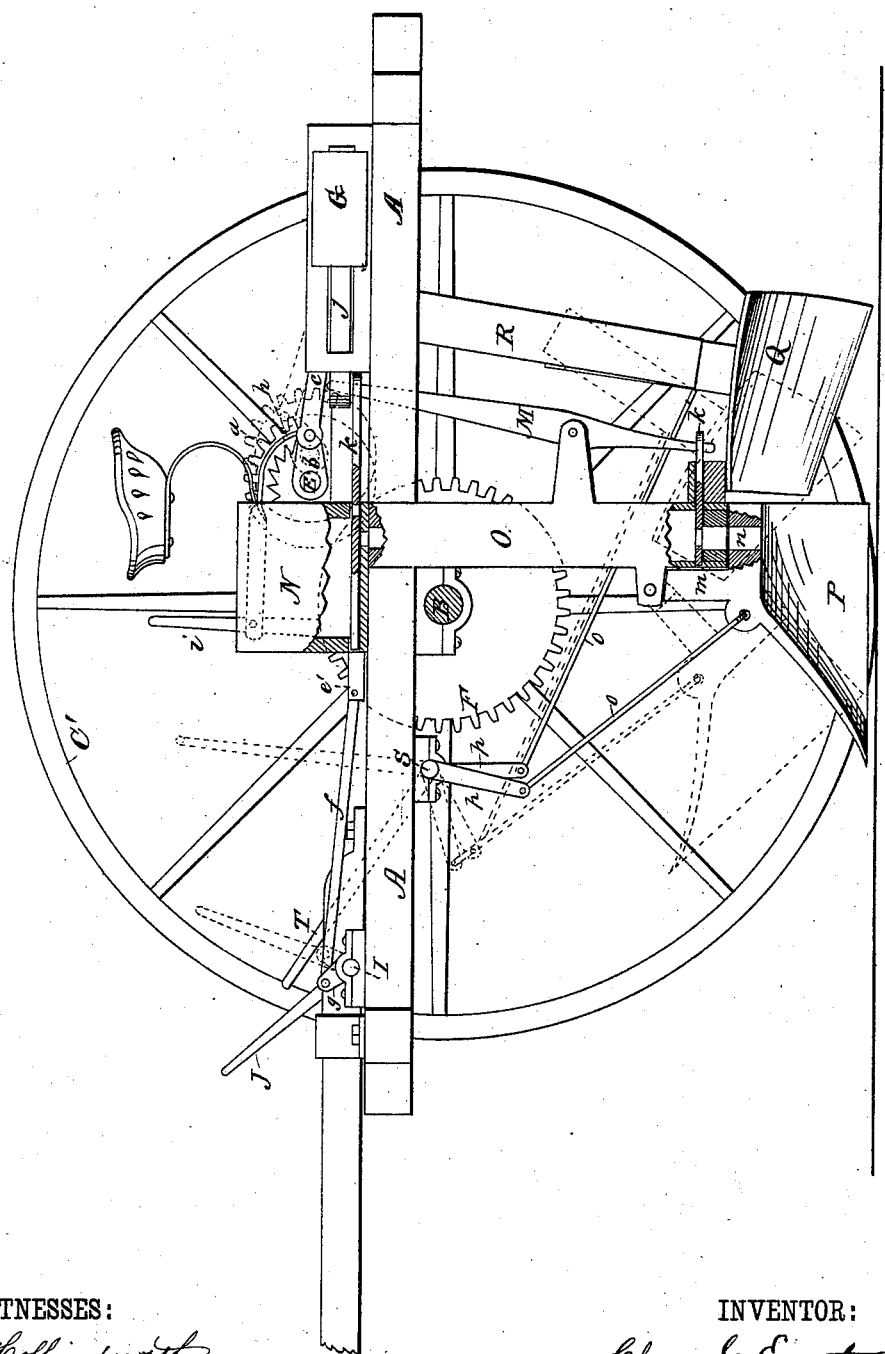
WITNESSES:
W. W. Hollingsworth
Edw. W. Byrn
INVENTOR:
Chas. G. Everet
BY
ATTORNEYS.

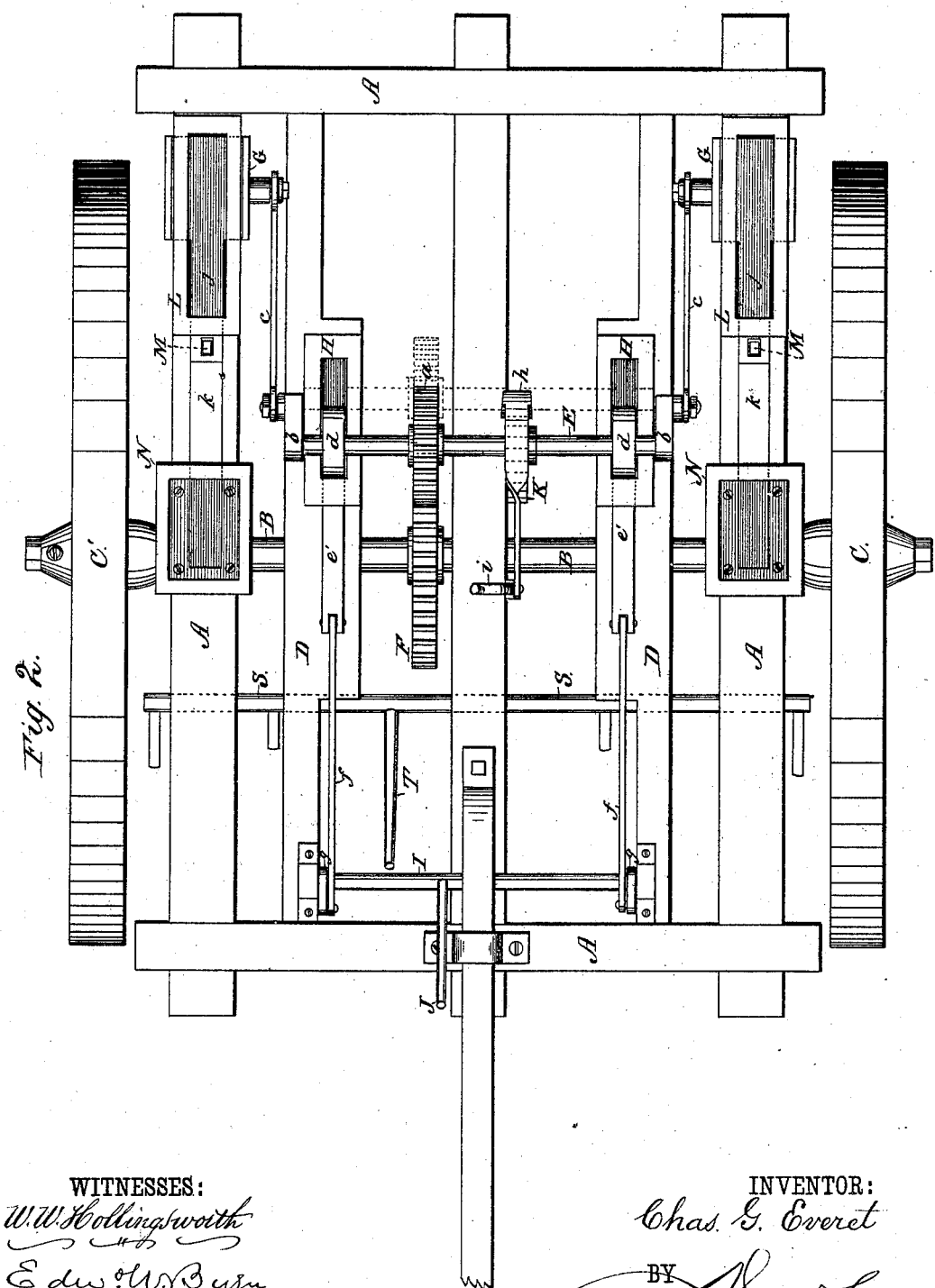

3 Sheets—Sheet 3.
C. G. EVERET.
Corn-Planter.
No. 216,386. Patented June 10, 1879.
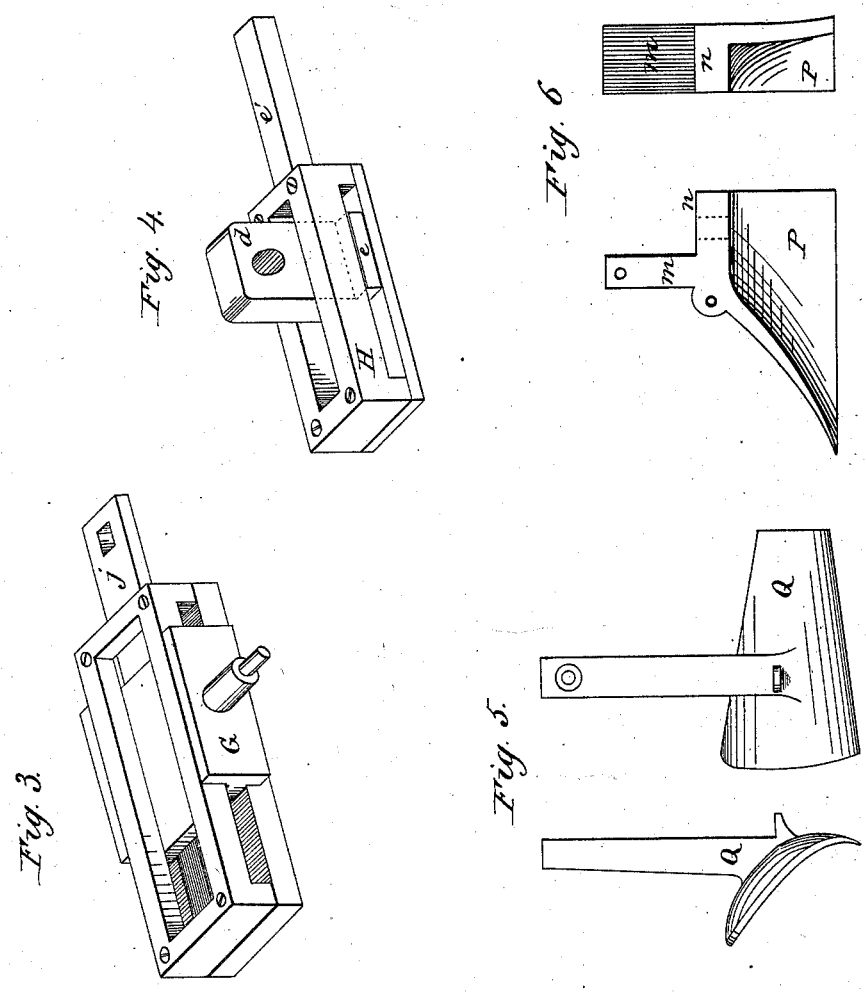
WITNESSES:
W. W. Hollingsworth
Edw. W. Byrn
INVENTOR:
Chas. G. Everet
BY
ATTORNEYS.

UNITED STATES PATENT OFFICE.

CHARLES G. EVERET, OF BELLEFONTAINE, OHIO.

IMPROVEMENT IN CORN-PLANTERS.

Specification forming part of Letters Patent No. 216,386, dated June 10, 1879; application filed March 3, 1879.

*To all whom it may concern:*

Be it known that I, CHARLES G. EVERET, of Bellefontaine, in the county of Logan and State of Ohio, have invented a new and Improved Corn-Planter; and I do hereby declare that the following is a full, clear, and exact description of the same, reference being had to the accompanying drawings, forming part of this specification, in which—

Figure 1 is a side elevation, partly in section. Fig. 2 is a plan view; Fig. 3, a detail, in perspective, of the sliding cross-head and guide; Fig. 4, a similar view of the sliding bearings of the counter-shaft. Fig. 5 represents details of the coverers. Fig. 6 represents details of the plow or opener.

My invention relates to an improvement in check-row corn-planters; and it consists chiefly in the peculiar arrangement of devices for imparting motion from the drive-shaft to the feed-slides, and permitting said devices to be disconnected when desired, as hereinafter fully described, and pointed out in the claims.

In the drawings, A represents a rectangular frame, beneath which in suitable bearings is arranged the main drive-shaft B. Said shaft is supported upon two running-wheels, C C', of which C is loose on the shaft, and C' made rigid with it, so as to cause the draft to impart rotary action to said shaft. D D are parallel longitudinal bars, arranged inside the outer frame, A, upon each side of the driver's seat. Upon these bars are located bearings which support a short transverse shaft, E, which shaft carries a pinion, *a*, that meshes with and receives motion from a gear-wheel, F, rigidly fixed on the main shaft B. The shaft E is provided at each end with crank-arms *b b*, to which are attached pitmen *c c*, the rear ends of which are connected to the sliding cross-heads G G, which operate the feed-slide.

Now it will be seen that whenever the rotary movement of the main shaft is transmitted to shaft E through the gear-wheels *a* F, this rotary movement of the shaft E is converted into a reciprocating movement of the feed-slides by the cranks *b*, pitmen *c*, and cross-heads G. In order to throw this driving mechanism out of gear from the main shaft, the shaft E is made bodily and laterally adjustable, so that its pinion *a* may be thrown into or out of gear with the drive-wheel F, as shown in dotted lines; and to permit this action said shaft E is located in specially constructed bearings, as follows: H is a metal box, having a slot at the top and one upon each side, in which box is contained a metal block having an upward extension, *d*, in which is located the bearing for the shaft E, which extension projects through the slot in the top of the metal box, and is guided thereby in its adjustment. Said block is also provided upon each side with ribs *e e*, (see Fig. 4,) which project through the side slots in the metal box to guide and hold the block down to its place. The forward ends of these blocks on each side are provided with tongues *e'*, which extend through openings in the front of said boxes, and are connected respectively with rods *f f*, which are attached to crank-arms *g g* on a rock-shaft, I, in front, which rock-shaft has an operating-lever, J. Now, by throwing this lever in one direction or the other, it will be seen that the bearing-blocks for shaft E are shifted in their boxes, and the shaft adjusted either to bring its pinion *a* into engagement with the gear-wheel F or to be out of contact with the same, as may be desired. By this means it will be seen that the action of the feeding devices may be continued or discontinued at will.

One of the essential features of a perfect check-row planter is that the feed-slides shall be capable of operation by hand independently of their connection with the drive-shaft. The object of this is to cause the seed to be properly dropped after turning at the end of the row, so that the rows being dropped shall be in line with those previously dropped. To permit this the shaft E is made capable of being rotated by hand when its pinion *a* is out of engagement with the drive-wheel F, and for this purpose there is located upon said shaft a ratchet-wheel, K, and arranged thereupon is a grappling-pawl, *h*, which is attached to and operated by a hand-lever, *i*, near the driver's seat. Now, when the driving devices are disconnected and the planter is turned into a new row, as soon as the seed-boxes are in line with the rows previously dropped the lever $i$ is worked back and forth, and its grappling-pawl is made to turn the ratchet-wheel and the shaft E until a quantity of seed are dropped. The shaft E may be then thrown forward, so that its pinion $a$ engages with F, and the dropping then proceeds regularly from the action of the drive-shaft.

The cross-heads G are arranged in slotted guide-frames L, and have at their front ends tongues $j$, which are connected to the feed-slide $k$. For connecting these two parts, (the tongue of the cross-head and the feed-slide,) and for operating at the same time a lower feed-slide, I employ a lever, M, which is fulcrumed on the rear side of the spout O, leading from the feed-box N. The upper end of this lever extends through holes in the ends of the feed-slide $k$ and tongue $j$, to effect connection between the same, as shown in Fig. 1, and the reciprocation of these parts also gives oscillatory movement to the lever to operate a second feed-slide, $k'$, located at the bottom of the spout O. The action of these two feed-slides, it will thus be seen, is made alternate—i. e., when seed is discharged through the upper slide the lower slide catches and holds it until the reverse movement takes place. When this occurs, the discharge is shut off at the upper slide and opened at the bottom slide, so that the seed which is retained upon the upper surface of the lower slide is dropped into the furrow.

The object of this spout O leading from the feed-box to near the ground, in connection with the lever, and the upper and lower slides operated thereby, is mainly to centralize the seed and prevent it from being scattered and distributed across the ground.

P represents furrow-openers. These consist of plows which have at their upper ends right-angular seats, which fit upon the front sides and bottoms of the spouts, the portions $m$ of each plow, which extend up in front of the spout, being hinged to plates upon the said spout at a point above its lower end, so that the plow may be lifted to throw the same forward and up out of the ground, while the portion $n$ forms, when the plows are in the ground, an abutment that rests against the lower end of the spout O to brace and firmly hold the plow. The part $n$, it will be seen, is perforated, so as to continue the passage of the seed therethrough close down in the furrow.

Q represents T-shaped coverers, the standards of which are pivoted to pendent bars R, and whose curved faces are arranged upon the mold-board side of the opening-plows, immediately in the rear of the same, so as to throw the dirt upon the seed. These coverers, as well as the hinged plows, are provided in front with rods $o$, which extend up to crank-arms $p$ on a rock-shaft, S, which may be rotated through a lever, T, to raise the plows and coverers out of the ground when they are not required to be in operation.

In defining my invention more clearly, I would state that I am aware that the feed-slide of a planter has been operated by a revolving shaft that was made laterally adjustable. I do not know, however, that a laterally-adjustable shaft has been arranged at right angles to the line of reciprocation of the feed-slide, and connected to said feed-slide through cranks, pitmen, and cross-heads moving in guides, as shown in my invention; hence,

Having thus described my invention, what I claim as new is—

1. The combination, with the shaft B, having gear-wheel F, and the two feed-boxes N, having feed-slides $k$, of the intermediate shaft E, having pinion $a$, and cranks $b$ $b$, the said shaft E being made laterally adjustable, and arranged at right angles to the line of movement of the feed-slide, together with the pitmen $c$ $c$, cross-heads G G, and guides L L, substantially as and for the purpose described.

2. The combination of the shaft E, the slotted box H, and the sliding blocks having extensions $d$, containing bearings for said shaft, ribs $e$ $e$ on its sides, and a tongue, $e'$, in front, together with connecting devices for adjusting the said block and shaft, substantially as described.

CHARLES GODFRIED EVERET.

Witnesses:
JOHN CANBY,
GEO. W. RIFE.